United States Patent [19]
Yamamoto

[11] Patent Number: 5,739,043
[45] Date of Patent: Apr. 14, 1998

[54] METHOD FOR PRODUCING A SUBSTRATE HAVING CRYSTALLINE SILICON NUCLEI FOR FORMING A POLYSILICON THIN FILM

[75] Inventor: Kenji Yamamoto, Kobe, Japan

[73] Assignee: Kanegafuchi Chemical Industry Co., Ltd., Osaka, Japan

[21] Appl. No.: 599,652

[22] Filed: Feb. 12, 1996

Related U.S. Application Data

[62] Division of Ser. No. 142,306, filed as PCT/JP93/00338 Mar. 23, 1993, Pat. No. 5,517,037.

[30] Foreign Application Priority Data

| Mar. 25, 1992 | [JP] | Japan | 4-100566 |
| Mar. 25, 1992 | [JP] | Japan | 4-100567 |
| Mar. 28, 1992 | [JP] | Japan | 4-101898 |
| Apr. 1, 1992 | [JP] | Japan | 4-109259 |

[51] Int. Cl.$^6$ ................................ H01L 21/268
[52] U.S. Cl. ............... 437/21; 437/174; 437/233; 437/967; 437/937; 117/8; 117/904; 148/DIG. 93
[58] Field of Search ............. 437/937, 21, 40 TFT, 437/41 TFT, 46, 173, 174, 233, 907, 908, 967; 117/7, 8, 10, 904; 148/DIG. 90, DIG. 91, DIG. 92, DIG. 93

[56] References Cited

U.S. PATENT DOCUMENTS

| 4,151,058 | 4/1979 | Kaplan et al. | 437/937 |
| 4,719,501 | 1/1988 | Nakagawa et al. | 257/64 |
| 4,789,883 | 12/1988 | Cox et al. | 257/321 |
| 4,947,219 | 8/1990 | Boehm | 257/75 |
| 5,006,180 | 4/1991 | Kanai et al. | 257/64 |
| 5,164,338 | 11/1992 | Graeger et al. | 437/109 |
| 5,200,630 | 4/1993 | Nakamura et al. | 257/570 |
| 5,354,698 | 10/1994 | Cathey | 437/937 |
| 5,424,230 | 6/1995 | Wakai et al. | 437/40 TFT |

FOREIGN PATENT DOCUMENTS

| 56-23748 | 3/1981 | Japan |  |
| 56-43734 | 4/1981 | Japan |  |
| 58-35916 | 3/1983 | Japan | 437/174 |
| 58-93243 | 6/1983 | Japan |  |
| 59-54218 | 3/1984 | Japan | 437/937 |
| 62-31111 | 2/1987 | Japan |  |
| 62-292695 | 12/1987 | Japan |  |
| 63-55929 | 3/1988 | Japan |  |
| 63-224233 | 9/1988 | Japan |  |
| 64-35960 | 2/1989 | Japan |  |
| 4-280669 | 10/1992 | Japan |  |
| 6-252170 | 9/1994 | Japan | 437/41 TFT |
| 6-333823 | 12/1994 | Japan |  |

OTHER PUBLICATIONS

C. Jian et al., Chinese J. Semicond. 10(3)(1989)217 "Influence of annealing on Ar laser recrystallized poly-Si . . . " Mar. 1989.
Translation of JP 63-55929 Mar. 1988.
Translation of JP 56-23748 Mar. 1981.
Translation of JP 62-31111 Feb. 1987.
T. Noguchi et al., Jpn.J.Appl.Phys., 24(6)(1985)L434, ". . . Super Thin Polysilicon Films . . . " Jun. 1985.
T. Takeshita et al., Jpn.J.Appl.Phys., 27(11)(1988)L2118. "ECR Hydrogen Plasma . . . TFTs" Nov. 1988.
M. Heintze et al., Appl.Phys.Lett., 64(23)(1994)3148. "Lateral Structuring of Si Thin Films . . . " Jun. 1994.

*Primary Examiner*—Charles L. Bowers, Jr.
*Assistant Examiner*—Leon Radomsky
*Attorney, Agent, or Firm*—Nikaido Marmelstein Murray & Oram LLP

[57] ABSTRACT

A method for producing a substrate for forming a polysilicon thin film by forming an amorphous silicon film of a thickness not more than 200 Å, irradiating excimer laser light onto the amorphous silicon film to crystallize silicon particles contained in the amorphous silicon film; and irradiating the amorphous silicon film with hydrogen radicals to etch the amorphous silicon film.

6 Claims, 4 Drawing Sheets

Fig. 4

METHOD FOR PRODUCING A SUBSTRATE HAVING CRYSTALLINE SILICON NUCLEI FOR FORMING A POLYSILICON THIN FILM

This is a division of application Ser. No. 08/142,306 filed as PCT/JP93/00338 Mar. 23, 1993, now U.S. Pat. No. 5,517,037.

TECHNICAL FIELD

The present invention relates to a polysilicon thin film which is fabricated on an inexpensive glass substrate or the like, and a production method therefor.

BACKGROUND ART

Polysilicon thin films have been used previously in order to simplify the manufacturing processes and reduce the manufacturing costs of thin-film transistors and thin-film solar cells. Although these polysilicon thin films can be obtained, it is not possible to use inexpensive glass substrates (usual softening point not more than 650° C.) since with the prior art a temperature of not less than 650° C. is required. On the other hand, with glass substrates having a high softening point, there is a problem of diffusion of impurities in the substrate into the polysilicon, and a further problem is that due to the difference in thermal expansion coefficient between the polysilicon and the glass substrate, it is difficult to deposit polysilicon onto a glass substrate.

Moreover, in order to minimize carrier recombination in the polysilicon thin film, the crystal grain diameter (below, grain size) needs to be controlled. Since the grain size of the polysilicon thin film is influenced by the substrate temperature, the grain size of polysilicon thin films is generally controlled by varying the substrate temperature. At that time, the substrate temperature is varied between 600° C. and 1100° C. Accordingly, for the above reason, it is not possible to control the grain size of polysilicon formed on inexpensive glass substrates. For a similar reason, it is not possible to control the grain size of polysilicon thin films formed on metal substrates.

On the other hand, in a recently proposed annealing method in which a polysilicon film is obtained by annealing an amorphous silicon film using an excimer laser, it is necessary to move the substrate or the optical system because of the small size of the laser spot. A problem here is that it is difficult to obtain a uniform polysilicon film over a large area, since either the crystallization at the boundary region is uneven or there is a remnant of the amorphous part.

Furthermore, another disadvantage concerning the control of the grain size of the polysilicon film is that, since the grain size is basically determined by the substrate temperature, it is difficult to form a product having a large grain diameter.

The present invention has been realized in consideration of these kinds of problems inherent in the prior art, and accordingly, the main object of this invention is to provide a polysilicon thin film which can be formed on an inexpensive glass substrate or metal substrate, and moreover, whose grain size can be controlled, and a production method therefor. A further object of the present invention is to provide a substrate for forming a thin polysilicon film and a production method therefor, as well as a radical source used for forming a polysilicon thin film.

DISCLOSURE OF THE INVENTION

The first mode of the present invention relates to a polysilicon thin film characterized in that it is formed on a substrate and has a particulate product of $SiO_x$ ($0<x\leq2$) of size not more than 100 Å at the interface of the substrate with the polysilicon.

In the first mode of the present invention, it is preferred that the above-mentioned $SiO_x$ particulate product of size not more than 100 Å is dispersed into not more than 100 pieces per 0.1 μm square area.

In the first mode of the present invention, the $SiO_x$ particulate product preferably exists in an amorphous silicon matrix.

Furthermore, in the first mode of the present invention, it is preferable that the $SiO_x$ particulate product is formed by processing using plasma CVD of a gas mixture of a silane-series gas and an oxygen-series gas.

Here, the silane-series gas is preferably $SiH_4$ gas, $Si_2H_6$ gas or a gas mixture of these, and the oxygen-series gas is preferably $N_2O$ gas, $O_2$ gas, $H_2O$ gas or a gas mixture of these.

In addition, it is preferred that the density of the $SiO_x$ particulate product is determined by using the ratio of the oxygen-series gas to the silane-series gas, and that the value of this ratio is:

$$0 < \frac{\text{oxygen - series gas flow rate}}{\text{silane - series gas flow rate}} < 0.2$$

Still further, in the first mode of the present invention, the substrate is preferably a glass substrate or a metal substrate.

The second mode of the present invention relates to a method for producing a polysilicon thin film characterized in that a particulate product of $SiO_x$ ($0<x\leq2$) of size not more than 100 Å is formed on a substrate, and thereafter a polysilicon thin film is grown using this particulate product as a nucleus.

In the second mode of the present invention, the $SiO_x$ particulate product of size not more than 100 Å is preferably dispersed into not more than 100 pieces per 0.1 μm square area.

Furthermore, in the second mode of the present invention, the $SiO_x$ particulate product preferably exists in an amorphous silicon matrix.

Moreover, in the second mode of the present invention, the $SiO_x$ particulate product is preferably formed by processing using plasma CVD of a gas mixture of a silane-series gas and an oxygen-series gas.

Here, the silane-series gas is preferably $SiH_4$ gas, $Si_2H_6$ gas or a gas mixture of these, and the oxygen-series gas is preferably $N_2O$ gas, $O_2$ gas, $H_2O$ gas or a gas mixture of these.

In addition, in the second mode of the present invention, it is preferred that the density of the $SiO_x$ particulate product is determined by using the ratio of the oxygen-series gas to the silane-series gas, and that the value of this ratio is:

$$0 < \frac{\text{oxygen - series gas flow rate}}{\text{silane - series gas flow rate}} < 0.2$$

Still further, in the second mode of the present invention, the substrate is preferably a glass substrate or a metal substrate.

The third mode of the present invention relates to a polysilicon thin film characterized in that it is formed on a substrate which has been polished using silicon powder.

In the third mode of the present invention, the substrate is preferably a glass substrate or a glass substrate having either a transparent electrode or a thin metal film formed thereon.

Furthermore, in the third mode of the present invention, the particle diameter of the silicon powder is preferably from 1000 Å to 100 μm.

Moreover, in the third mode of the present invention, it is preferable that the polysilicon thin film is formed using repetitions comprising the fabrication of an amorphous silicon film by CVD or PVD followed by exposure to a hydrogen plasma for a set time, and more preferable that the hydrogen plasma is produced by an ECR discharge using a permanent magnet and that the hydrogen plasma has a hydrogen atomic flux of not less than $1\times10^{15}$ atom/cm$^2$ s and a hydrogen ion flux of not more than $1\times10^{16}$ atom/cm$^2$ s.

In addition, in the third mode of the present invention, it is preferred that the polysilicon thin film is fabricated at a temperature of not more than 500° C.

The fourth mode of the present invention relates to a method for producing a polysilicon thin film characterized in that a substrate is polished using silicon powder followed by fabrication of the polysilicon thin film on this substrate.

In the fourth mode-of the present invention, the substrate is preferably a glass substrate or a glass substrate having either a transparent electrode or a thin metal film formed thereon.

Furthermore, in the fourth mode of the present invention, the particle diameter of the silicon powder is preferably from 1000 Å to 100 μm.

Moreover, in the fourth mode of the present invention, it is preferable that the polysilicon thin film is formed using repetitions comprising the fabrication of an amorphous silicon film by CVD or PVD followed by exposure to a hydrogen plasma for a set time, and more preferable that the hydrogen plasma is produced by an ECR discharge using a permanent magnet and that the hydrogen plasma has a hydrogen atomic flux of not less than $1\times10^{15}$ atom/cm$^2$ s and a hydrogen ion flux of not more than $1\times10^{16}$ atom/cm$^2$ s.

In addition, in the fourth mode of the present invention, it is preferred that the polysilicon thin film is fabricated at a temperature of not more than 500° C.

The fifth mode of the present invention relates to a substrate for forming a polysilicon thin film characterized in that an amorphous silicon film is fabricated on a substrate, wherein the film thickness of the amorphous silicon film is not more than 200 Å and then the amorphous silicon is crystallized using irradiation with excimer laser light, together with formation of grains of silicon by etching using hydrogen radicals.

In the fifth mode of the present invention, the excimer laser is preferably an ArF, KrF or $F_2$ excimer laser.

Furthermore, in the fifth mode of the present invention, the flux of hydrogen radicals in the vicinity of the substrate is preferably not less than $1\times10^{15}$ atom/cm$^2$ s.

Moreover, in the fifth mode of the present invention, the energy of the excimer laser is preferably not less than 20 mJ/cm$^2$.

In addition, in the fifth mode of the present invention, the amorphous silicon is preferably fabricated by plasma CVD.

The sixth mode of the present invention relates to a method for producing a substrate for forming a polysilicon thin film characterized in that silicon particles contained in an amorphous silicon film of film thickness not more than 200 Å fabricated on a substrate are crystallized using excimer laser light irradiation onto the amorphous silicon film, together with etching of the amorphous silicon film by irradiation with hydrogen radicals.

In the sixth mode of the present invention, the excimer laser is preferably an ArF, KrF or $F_2$ excimer laser.

Furthermore, in the sixth mode of the present invention, the flux of hydrogen radicals in the vicinity of the substrate is preferably not less than $1\times10^{15}$ atom/cm$^2$ s.

Moreover, in the sixth mode of the present invention, the energy of the excimer laser is preferably not less than 20 mJ/cm$^2$.

In addition, in the sixth mode of the present invention, the amorphous silicon is preferably fabricated by plasma CVD.

The seventh mode of the present invention relates to a large-area radical source characterized in that radicals generated from a plasma source are transported via a transportation tube which is heated at not less than 300° C.

In the seventh mode of the present invention, the transportation tube which is heated at not less than 300° C. is preferably made of silicon oxide, silicon nitride, boron nitride or aluminum oxide.

Furthermore, in the seventh mode of the present invention, the $R_{max}$ of the surface of the transportation tube is preferably not more than 0.1 μm.

Moreover, in the seventh mode of the present invention, it is preferable that the plasma source is an ECR plasma source having a permanent magnet.

In addition, in the seventh mode of the present invention, it is preferable that the radical is hydrogen, oxygen, nitrogen or halogen, and more preferable both that the radical is hydrogen or oxygen and that the radical flux determined from the oxidation or reduction rate of silver on a quartz crystal oscillator is not less than $1\times10^{16}$ atom/cm$^2$ s.

The polysilicon thin film related to the first mode of the present invention is formed by growth at a nucleus of a SiO$_x$ particulate product of size not more than 100 Å existing on the interface with the substrate. Accordingly, the grain size of the polysilicon thin film related to the first mode of the present invention depends on the density of the SiO$_x$ particulate product. Hence, the grain size of the polysilicon thin film related to the first mode of the present invention is controlled by controlling the SiO$_x$ particulate product. Furthermore, because this SiO$_x$ can be formed on the substrate at not more than 500° C., it is possible to control the grain size of the polysilicon thin film at not more than 500° C.

The method for producing a polysilicon thin film related to the second mode of the present invention comprises the fabrication of a particulate product of SiO$_x$ (0<x≦2) of size not more than 100 Å on a substrate, thereafter growing the polysilicon thin film using this particulate product as a nucleus. Hence, in the production method of a polysilicon thin film of the second mode of the present invention, by controlling the density of the SiO$_x$ particulate product, it is possible to produce a polysilicon thin film having controlled grain size. Furthermore, as mentioned above, according to the production method of a polysilicon thin film of the second mode of the present invention, since the SiO$_x$ can be fabricated at not more than 500° C., it is possible to control the grain size of the polysilicon thin film at not more than 500 ° C.

The polysilicon thin film related to the third mode of the present invention can be fabricated at a low temperature because it is formed by growing on nuclei of particles of silicon powder adhered to a substrate which was polished using silicon powder. Hence, it is possible to fabricate on an inexpensive glass substrate. Furthermore, because the fabrication is carried out using particles of silicon powder as nuclei, the grain size can be controlled by controlling the particle diameter of the silicon powder.

In the production method of a polysilicon thin film related to the fourth mode of the present invention, the polysilicon thin film can be formed at a low temperature since the polysilicon thin film is formed on nuclei of particles of silicon powder adhered to a substrate after polishing the substrate with silicon powder. Furthermore, since it is possible to deposit onto an inexpensive glass substrate, a large-area polysilicon thin film can be obtained. Moreover, since the polysilicon thin film is formed using particles of silicon powder as nuclei, the grain size can be controlled by controlling the particle diameter of the silicon powder.

The substrate for forming a polysilicon thin film related to the fifth mode of the present invention is formed by fabricating a film of amorphous silicon of film thickness not more than 200 Å on a substrate, and then crystallizing this film by irradiation with excimer laser light together with formation of silicon grains by etching using irradiation with hydrogen radicals. Accordingly, the size and density of occurrence of the silicon nuclei on the substrate are controlled. Therefore, when the substrate for polysilicon related to the fifth mode of the present invention is used, a polysilicon thin film can be fabricated with controlled grain size.

In the production method of a substrate for forming a polysilicon thin film of the sixth mode of the present invention, an amorphous silicon film of film thickness not more than 200 Å is fabricated on a substrate, and since silicon particles contained in this film are crystallized using irradiation with excimer laser light onto this film together with hydrogen radical irradiation, it is possible to control the grain size and density of occurrence of the silicon nuclei formed on the substrate. Therefore, when a polysilicon thin film is fabricated using a substrate obtained by the production method of a substrate for polysilicon thin film formation related to the sixth mode of the present invention, the grain size of the polysilicon thin film can be controlled.

The large-area radical source related to the seventh mode of the present invention transports radicals generated from a plasma source through a transportation tube which is heated at not less than 300° C. Thus, with the large-area radical source related to the seventh mode of the present invention, since radicals are supplied using a transportation tube which is heated at not less than 300° C., both the surface of the substrate is not exposed to charged particles and the recombination rate of the radicals can be decreased, and moreover, a larger flux of radicals can be introduced onto the substrate surface.

BEST MODE FOR CARRYING OUT THE INVENTION

The present invention is explained based on the following examples; however, the scope of the invention is not limited only to these examples.

In the polysilicon thin film related to the first mode of the present invention and the production method of a polysilicon thin film related to the second mode of the present invention, control of the grain size of the polysilicon thin film is carried out by controlling the density of grains of $SiO_x$ formed on the substrate. Here, for the substrate, a glass substrate, a glass substrate having a transparent electrode or metal electrode fabricated thereon, or a metal substrate such as stainless steel, tungsten, molybdenum, nickel, titanium and so forth, can be used.

In the $SiO_x$ formed on the substrate, x is $0<x\leq 2$, and the $SiO_x$ becomes the nucleus for silicon fabrication. The generation density of polysilicon nuclei is approximately determined by the density of $SiO_x$. The size of the $SiO_x$ which can become a nucleus is preferably from 5 Å to 100 Å, and more preferably from 10 Å to 40 Å.

The density of occurrence of $SiO_x$ is determined by the ratio of the oxygen-series gas flow rate to the silane-series gas flow rate.

Here, the oxygen-series gas may be $N_2O$ gas, $O_2$, $H_2O$ gas or a gas mixture of these, and the silane-series gas may be $SiH_4$ gas, $Si_2H_6$ gas or a gas mixture of these. However, generally, $H_2O$ gas is used as the oxygen-series gas and $SiH_4$ gas is used as the silane-series gas. The ($H_2O/SiH_4$) gas flow rate ratio is from 0.001% to 10%, and preferably from 0.01% to 1%.

Then, the relationship between the density Of occurrence of $SiO_x$ nuclei and the ($H_2O/SiH_4$) gas flow rate ratio is: $H_2O/SiH_4=0.0001$ gives about one nucleus per 0.1 μm square, and $H_2O/SiH_4 =0.01$ gives about 20 nuclei per 0.1 μm square. Here, 0.1 μm square indicates 0.1 μm by 0.1 μm.

In addition to the gas flow rate ratio, the substrate temperature is a controlling parameter of the density of the $SiO_x$ particulate product.

From the viewpoint of facilitating the subsequent formation of polysilicon, the higher the temperature the more distinctly separated is the granular $SiO_x$ in the amorphous silicon matrix. Here, the amorphous silicon matrix is defined as hydrogenated amorphous silicon, a-Si:H, having a hydrogen content of not less than 0.01 atom % and not more than 60 atom %.

On the other hand, the reaction chamber pressure has an effect similar to increasing the oxygen flow rate, particularly at higher pressure, but there is little influence on the nucleus generation density.

The following three processes are methods for fabricating polysilicon thin films after generating nuclei.

(1) A method for obtaining a polysilicon thin film by plasma CVD of silane or disilane which is highly diluted with hydrogen.

In this method, a typical deposition process is as follows: the polysilicon thin film is fabricated by plasma CVD using 1% to 0.001% hydrogen dilution of silane or disilane, a reaction chamber pressure of from 1 Torr to 10 Torr, an RF power density of from 5 W/cm² to 10 W/cm² and a substrate temperature of from 200° C. to 500° C.

(2) A method in which an amorphous silicon film is deposited using plasma CVD of silane or disilane and crystallized using long-term annealing at a temperature of from 500° C. to 600° C.

In this method, a typical deposition process is as follows: an amorphous silicon film is deposited by plasma CVD of 50 to 200 sccm silane or disilane gas, at 1 Torr to 2 Torr reaction chamber pressure, from 1 W/cm² to 10 W/cm² RF power density and from 300° C. to 500° C. substrate temperature, and annealed under vacuum for 40 h at 550° C.

(3) A method in which a polysilicon film is fabricated by repetitions of deposition of a very thin film of amorphous silicon and hydrogen plasma treatment.

In this method, a typical deposition process is as follows: a very thin film of amorphous silicon (from about 2 Å to about 200 Å) is fabricated by plasma CVD, and successively, the very thin a-Si:H film is crystallized using hydrogen radicals generated in a hydrogen plasma. By repetitions of the deposition of a-Si:H by plasma CVD and hydrogen plasma treatment, crystals are obtained. In particular, in the hydrogen plasma treatment, from the viewpoint of the ability to generate a large amount of hydrogen atomic density over a large area, it is desirable that the hydrogen plasma is generated using an ECR discharge.

A more detailed explanation of the first and second modes of the present invention is given below, based on specific examples.

EXAMPLE 1

In a plasma CVD apparatus, a 20 Å thick amorphous silicon film was deposited on a glass substrate using deposition conditions of 40 sccm $SiH_4$ gas, 200 sccm $H_2$ gas, 2 sccm $H_2O$ gas, 400° C. substrate temperature and 1 W/cm$^2$ RF power density.

On observing the deposited film, the amorphous silicon was seen to contain granular $SiO_x$. The results of TEM observation showed a 20 to 30 Å granular product with an average of 5 to 7 grains per 1000 Å square.

Using the same apparatus, and deposition conditions of 1 sccm $SiH_4$, 200 sccm $H_2$, 1 Torr reaction chamber pressure, 1 W/cm$^2$ RF power density and 400 ° C. substrate temperature, a polysilicon thin film was fabricated on a glass substrate on which was formed a particulate product realized by the above-described treatment.

The grain diameter of the deposited film was 2000 Å to 3000 Å by SEM observation.

EXAMPLES 2 to 5

Using the same apparatus as in Example 1, on a glass substrate, under changed deposition conditions of 400° C. substrate temperature, 1 Torr reaction chamber pressure, 1 W/cm$^2$ RF power density and a $H_2O/SiH_4$ gas flow rate ratio of 0.001 to 0.1, a 20 Å thick film was deposited, and successively, under the same conditions as in Example 1, a polysilicon film was fabricated.

The gas flow rate ratio (oxygen-series gas flow rate/silane-series gas flow rate) of the oxygen-series gas flow rate to the silane-series gas flow rate was varied, and the grain size of the obtained polysilicon thin films examined. The results are shown in Table 1.

From Table 1, it is seen that a decrease in the flow rate of the oxygen-series gas is accompanied by an increase in the grain size of the polysilicon film, and a polysilicon thin film having a large grain size is obtained.

TABLE 1

| $H_2O/SiH_4$ gas flow rate ratio | Silicon grain size |
|---|---|
| 0.001 (Example 2) | 7000 Å-1 μm |
| 0.005 (Example 3) | 2000 Å-4000 Å |
| 0.04 (Example 4) | 600 Å-1500 Å |
| 0.10 (Example 5) | 200 Å-500 Å |

COMPARATIVE EXAMPLE 1

Deposition was carried out similarly to Example 1, except that $SiO_x$ was not formed.

When the obtained film was observed, as a result of the lack of formation of $SiO_x$ nuclei, growth of a polysilicon film could not be seen.

COMPARATIVE EXAMPLE 2

Without fabricating $SiO_x$, a 5 μm thick film of amorphous silicon was deposited by plasma CVD under deposition conditions of 100 sccm $SiH_4$, 1 Torr reaction chamber pressure, 400° C. substrate temperature and 0.5 W/cm$^2$ RF power density. Thereafter, annealing was carried out at 550° C. for 40 h under vacuum.

From the results of SEM observation of the deposited film, a polysilicon thin film having a small grain size of from 100 to 200 Å could only be obtained.

As explained above, despite being fabricated on an inexpensive glass substrate or the like, the grain size of the polysilicon thin film of the first mode of the present invention is controlled. Furthermore, according to the method for producing a polysilicon thin film related to the second mode of the present invention, it is possible to control the grain size while depositing a polysilicon thin film on an inexpensive glass substrate or the like. Therefore, according to the first and second modes of the present invention, cost reduction of thin-film transistors and thin-film solar cells can be promoted.

Figure 1:
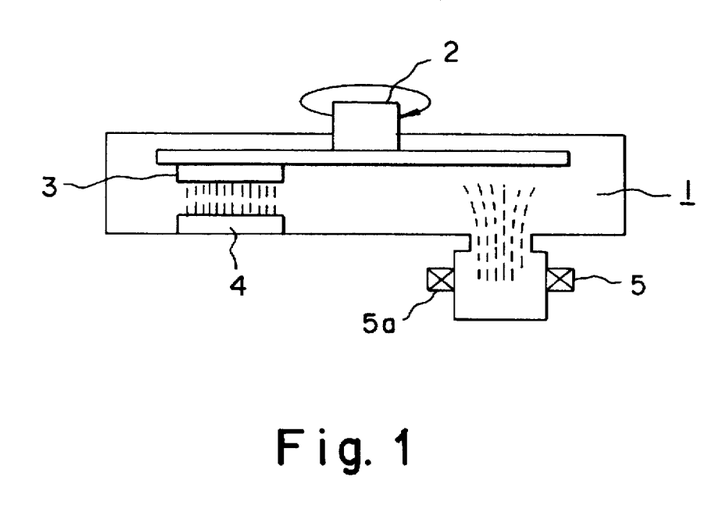
FIG. 1 is a schematic illustration of the deposition apparatus used in the third and fourth modes of the present invention.

FIG. 1 is a schematic illustration of the deposition apparatus used in the third and fourth modes of the present invention. In the Figure, the numeral 1 indicates a chamber, 2 indicates a device for rotating a substrate, 3 indicates a glass substrate, 4 indicates an RF electrode and 5 indicates an ECR apparatus.

The polysilicon thin film related to the third mode of the present invention is fabricated on a glass substrate, in particular having control of the grain size. Furthermore in the production method of a polysilicon thin film related to the fourth mode of the present invention, in particular, the grain diameter is controlled while fabricating the polysilicon thin film on a glass substrate.

As a method for controlling the grain diameter, a glass substrate or a glass substrate on which is fabricated either a transparent electrode or a metal electrode is polished with silicon powder or a paste containing silicon powder. The particle diameter of the silicon powder is preferably from 1000 Å to 100 μm, and more preferably from 1 μm to 50 μm.

Furthermore, the polishing method is carried out by dispersing silicon powder in an organic solvent and using an ultrasonic cleaner for a controlled time. The amount of dispersed silicon powder is from 0.1 g to 10 g, and preferably from 1 g to 10 g per liter of ethanol. The polishing time is from 5 min. to 30 min., preferably from 10 min. to 20 min.

The third and fourth modes of the present invention are explained in detail below, based on specific examples.

EXAMPLE 6

A glass substrate (Corning 7059 substrate (flat)) 3 was subjected to ultrasonic treatment for 20 min. in a dispersion of 10 g of 1 μm particle diameter silicon powder in 1 liter of ethanol. Following this, after ultrasonic cleaning in acetone, a polysilicon thin film was fabricated in the plasma CVD apparatus shown in FIG. 1.

The polysilicon film was obtained under the fabrication conditions of repetitions of depositing 15 Å of amorphous silicon (below, expressed as a-Si:H) at the side of the RF electrode 4 shown in FIG. 1, and annealing with hydrogen atoms (not less than 1×10$^{16}$ atom/cm$^2$ %) at the ECR apparatus 5 side. Here, in the Figure, 5a indicates a permanent magnet.

The a-Si:H deposition conditions were 40 sccm $SiH_4$ gas, 200 sccm $H_2$ gas, 0.5 Torr reaction chamber pressure, 20 mW/cm$^2$ RF power density and 250° C. substrate temperature.

The anneal by hydrogen atoms was carried out using 200 sccm $H_2$ gas, 20 mTorr reaction chamber pressure, 450 W microwave power and 250° C. substrate temperature. At this time, the flux of hydrogen atoms arriving at the substrate 3 was not less than $1 \times 10^{16}$ atoms/$cm^2$ s and the flux of hydrogen ions was not more than $1 \times 10^{14}$ atom/$cm^2$ s. From the results of x-ray diffraction and Raman measurements, the obtained film was seen to have crystals. Furthermore, from SEM observation, the grain diameter in the range of 1 μm film thickness was from 1000 Å to 2000 Å.

COMPARATIVE EXAMPLE 3

After ultrasonic cleaning of a glass substrate (Corning 7059 substrate (flat)) in a solution of ethanol and acetone which did not contain silicon powder, film deposition was carried out under similar conditions to Example 6.

In the condition where there was no polishing with powder, a film was not formed at all on the glass substrate. In this case, where silicon nuclei were not formed on the glass substrate, it can be said that there was no crystal growth.

From this, it is understood that polishing of the glass substrate with silicon powder promotes the generation of nuclei.

EXAMPLE 7

A glass substrate (Corning 7059 substrate (flat)) 3 was ultrasonically treated, for 10 min. in a dispersion of 10 g of silicon powder of particle diameter 1 μm in 1 liter of ethanol.

Following this, a polysilicon thin film was fabricated using a similar method to Example 6. When the fabricated polysilicon thin film was observed by SEM, the grain size was 2000 Å to 5000 Å.

From this, it is understood that the density of occurrence of nuclei can be controlled by the ultrasonic treatment time, and by using this, the grain size can be controlled.

As explained above, the polysilicon thin film related to the third mode of the present invention is a polysilicon thin film whose grain size is controlled at low temperature while fabricating on an inexpensive glass substrate. Furthermore, in the production method of a polysilicon thin film related to the fourth mode of the present invention, it is possible to control the grain size of the polysilicon thin film while fabricating on an inexpensive glass substrate. From the ability to deposit onto an inexpensive glass substrate, a large-area polysilicon thin film can easily be obtained. Therefore, upscaling of thin-film transistors and thin-film solar cells to large size can be achieved at low cost.

Figure 2:
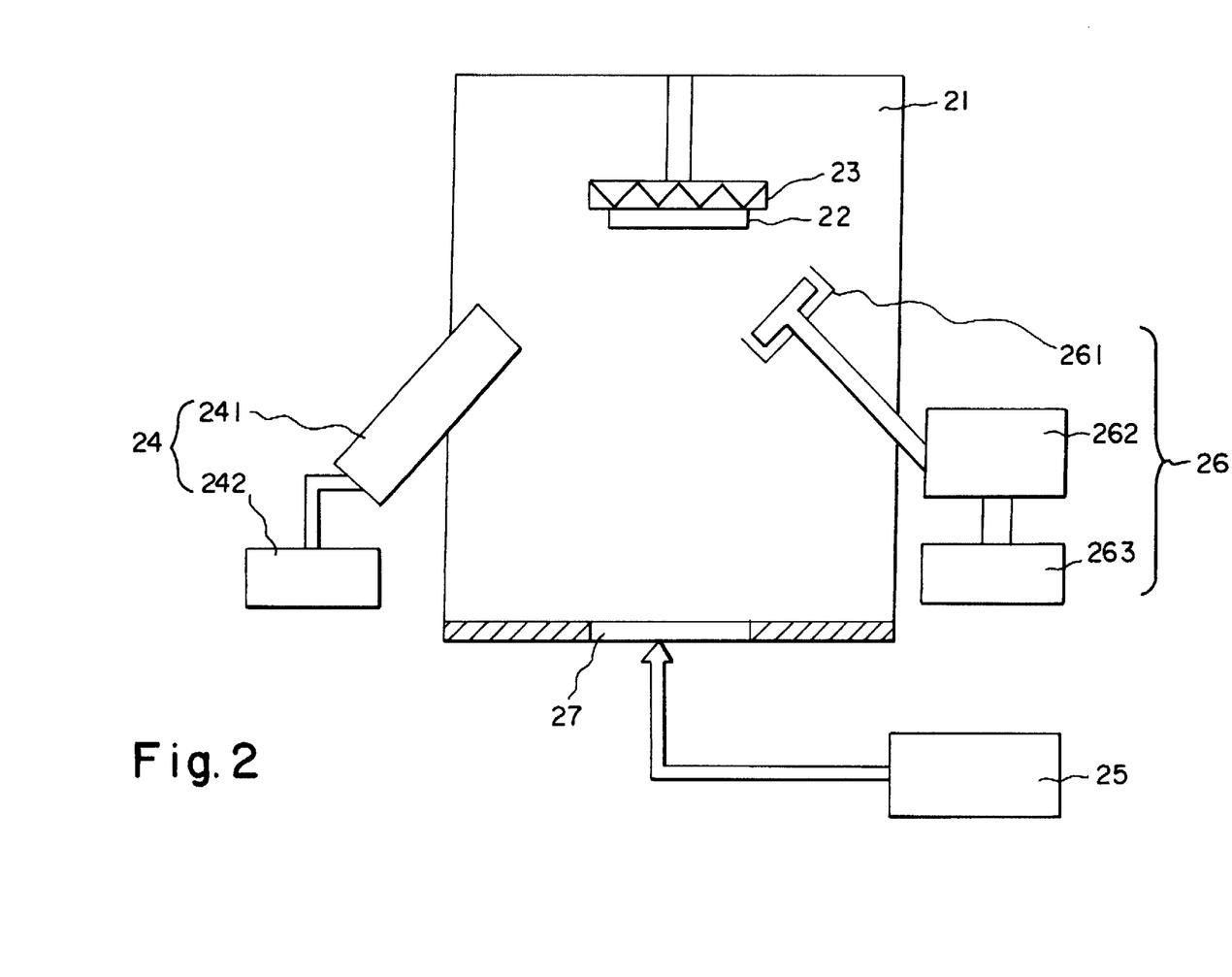
FIG. 2 is a schematic illustration of the apparatus used in the fifth and sixth modes of the present invention.

FIG. 2 is a schematic illustration of an apparatus used for fabricating the substrate for polysilicon formation related to the fifth mode of the present invention, and used for the production method of a substrate for polysilicon thin film formation related to the sixth mode of the present invention. In FIG. 2, the numeral 21 indicates a reaction chamber, 22 indicates a substrate, 23 indicates a heater, 24 indicates an ECR plasma generating apparatus, 25 indicates an excimer laser light source, 26 indicates a plasma CVD apparatus and 27 indicates a laser light entrance window.

For the substrate 22, a glass substrate, a glass substrate with a fabricated transparent electrode or metal electrode, or a metal substrate such as stainless steel, tungsten, molybdenum, nickel, titanium, and so forth, can be used.

Here, since the construction of the heater 23, the ECR plasma generating apparatus 24, the excimer laser light source 25, the plasma CVD apparatus 26 and the laser light entrance window 27 are similar to conventional types, a detailed explanation of their construction is omitted.

Using the apparatus shown in FIG. 2, in order to deposit polysilicon of large grain size on the substrate 22, it is important how the size and density of the silicon nuclei are controlled.

(1) The size of the silicon nuclei formed on the substrate 22 may be from 10 Å to 200 Å, but a grain diameter of from 20 Å to 100 Å is preferred. Here, the size of the silicon nucleus is controlled by the film thickness of the amorphous silicon film deposited on the substrate 22.

This amorphous silicon film is deposited by normal plasma CVD under conditions of 250° C. to 350° C. substrate temperature, 0.1 Torr to 1 Torr reaction chamber pressure and 0.01 W/$cm^2$ to 1 W/$cm^2$ RF power density.

Furthermore, the amorphous silicon film thickness is usually from 15 Å to 250 Å. The grain diameter of the silicon nuclei fabricated by laser annealing of this amorphous silicon film using an excimer laser, is approximately equal to the film thickness, but there is a tendency for small parts of the film to become thinner. At this time, because of the absorption coefficient of the amorphous silicon, it is preferable to use a shorter-wavelength excimer laser, for example, KrF, ArF, $F_2$, or the like, are preferred. The optimum value of the energy during the laser anneal differs according to this wavelength, but may be from 20 mJ/$cm^2$ to 400 mJ/$cm^2$, preferably from 50 mJ/$cm^2$ to 300 mJ/$cm^2$.

(2) The density of the silicon nuclei is determined mainly by the size of the flux of hydrogen radicals and the substrate temperature.

The size of the flux of hydrogen radicals may be from $1 \times 10^{15}$ atom/$cm^2$ s to $1 \times 10^{18}$ atom/$cm^2$ s, but is preferably from $1 \times 10^{16}$ atom/$cm^2$ s to $1 \times 10^{18}$ atom/$cm^2$ s. When the flux is less than $1 \times 10^{15}$ atom/$cm^2$ s, the etching reaction of the amorphous silicon film does not progress, and there is a disadvantage in that control of the density of silicon nuclei is not possible. Conversely, when the flux is not less than $1 \times 10^{18}$ atom/$cm^2$ s, the amorphous silicon film is almost entirely etched, which is not desirable.

For the substrate temperature, the higher the temperature the better to advance the etching reaction, but in consideration of the use of a glass substrate as the substrate 22, the temperature may be from 200° C. to 500° C., and is preferably from 300° C. to 500° C.

The fifth and sixth modes of the present invention will be explained in detail below, based on more specific examples.

EXAMPLE 8

Using the apparatus shown in FIG. 2, a substrate for forming a polysilicon thin film was fabricated by the following procedure.

Firstly, 50 sccm of $SiH_4$ gas was introduced in the vicinity of the substrate, and using the plasma CVD apparatus 26 of FIG. 2, a 100 Å thick amorphous silicon film was deposited on a glass substrate 2 under the deposition conditions of 400° C. substrate temperature, 0.1 Torr reaction chamber pressure and 0.1 W/$cm^2$ RF power density. Here, in FIG. 2, the numeral 261 indicates an RF electrode, 262 indicates a matching box and 263 indicates an electric source.

Next, without using the plasma CVD apparatus 26 shown in FIG. 2, the substrate 22 with the deposited 100 Å thick amorphous silicon film was treated by the above-mentioned treatment using the excimer laser light source 25 and the ECR plasma apparatus 24. Here, in FIG. 2, the numeral 241 indicates an ECR plasma source and 242 indicates a microwave source.

As an excimer laser light, ArF (193 nm) was used at an energy of 70 mJ/cm². Furthermore, irradiation with the laser light was carried out at a frequency of 5 Hz for 2 min. through the laser light entrance window 27.

Simultaneously, 100 sccm of hydrogen gas was introduced at the ECR plasma source 41, a hydrogen plasma was generated under 400 W ECR power and 5 mTorr reaction chamber pressure, and the substrate 22 was irradiated with this plasma for 2 min. The hydrogen plasma flux at this time was $4\times10^{16}$ atom/cm² s and the substrate temperature was 400° C.

Using the above process, silicon nuclei were formed on the glass substrate 22.

On the substrate 22 realized by the above-mentioned treatment, a polysilicon film was deposited by plasma CVD. The deposition conditions were 2 sccm $SiH_4$ gas, 400 sccm $H_2$ gas, 1 Torr reaction chamber pressure, 1 W/cm² RF power density and 400° C. substrate temperature.

From SEM observation, the grain diameter of the obtained polysilicon thin film was from 4000 Å to 5000 Å.

PRODUCTION EXAMPLES 9 TO 15

Using the substrate 22 realized by treatment using the aforesaid method, polysilicon thin films were deposited (Production Examples 9 to 15) using a fixed substrate temperature of 400° C., a fixed reaction chamber pressure of 5 mTorr, a fixed hydrogen gas flow rate of 100 sccm, a fixed hydrogen plasma and laser light irradiation time, a laser irradiation frequency of 5 Hz, and varied ArF excimer laser energy density and ECR power for generating the hydrogen plasma, and the grain diameter was measured from SEM photographs. The results are shown in Table 2.

TABLE 2

Fabrication conditions of substrates having silicon nuclei

| ArF energy density (mJ/cm²) | ECR power (W) | Grain diameter from SEM observation |
|---|---|---|
| 50 (Prod. Ex. 9) | 400 | 2000 Å–3000 Å |
| 70 (Prod. Ex. 10) | 400 | 4000 Å–5000 Å |
| 100 (Prod. Ex. 11) | 400 | 5000 Å–6000 Å |
| 200 (Prod. Ex. 12) | 400 | 8000 Å–10000 Å |
| 70 (Prod. Ex. 13) | 100 | 1000 Å–20000 Å |
| 70 (Prod. Ex. 14) | 200 | 3000 Å–4000 Å |
| 70 (Prod. Ex. 15) | 600 | 5000 Å–6000 Å |

As explained above, when the substrate for forming a polysilicon thin film related to the fifth mode of the present invention is used, a polysilicon thin film having a large grain size can be obtained. Furthermore, according to the production method of a substrate for forming a polysilicon thin film related to the sixth mode of the present invention, a substrate which can be used to form a polysilicon thin film of large grain size can be fabricated.

Figure 3:
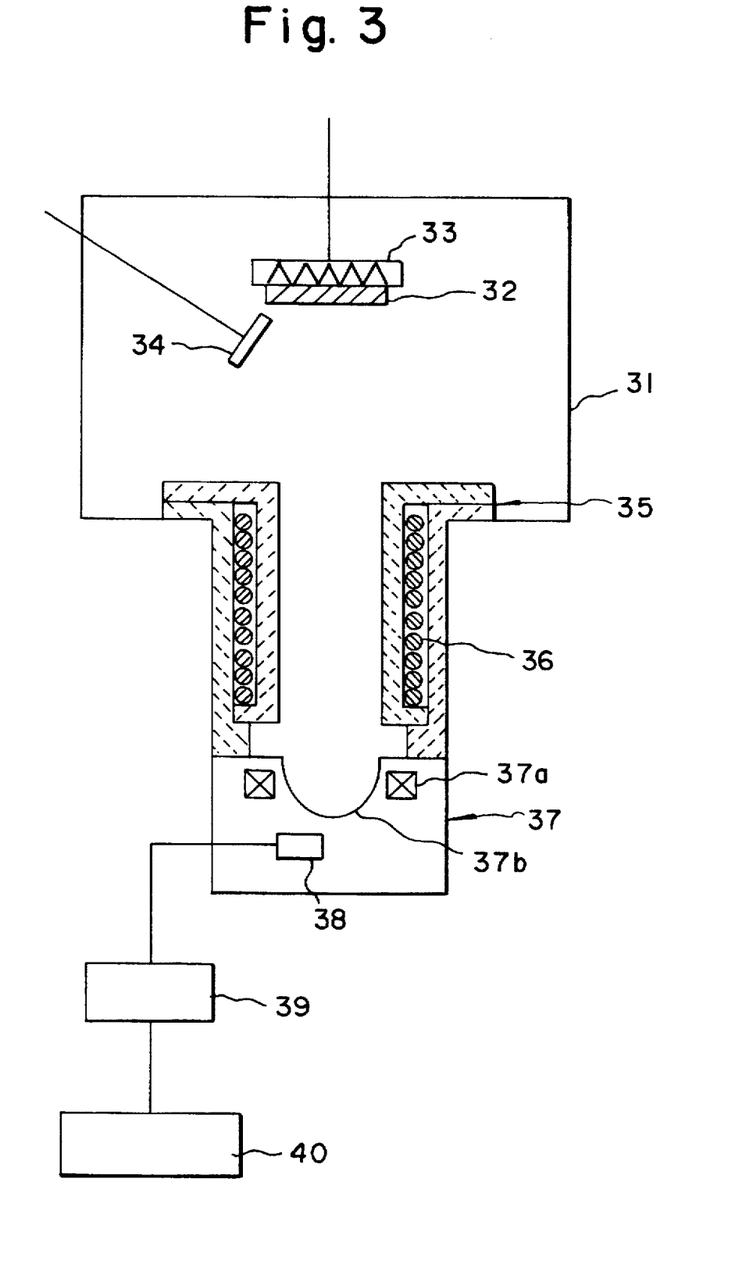
FIG. 3 is a schematic illustration of a deposition apparatus using the large-area radical source of the seventh mode of the present invention.
Figure 4:
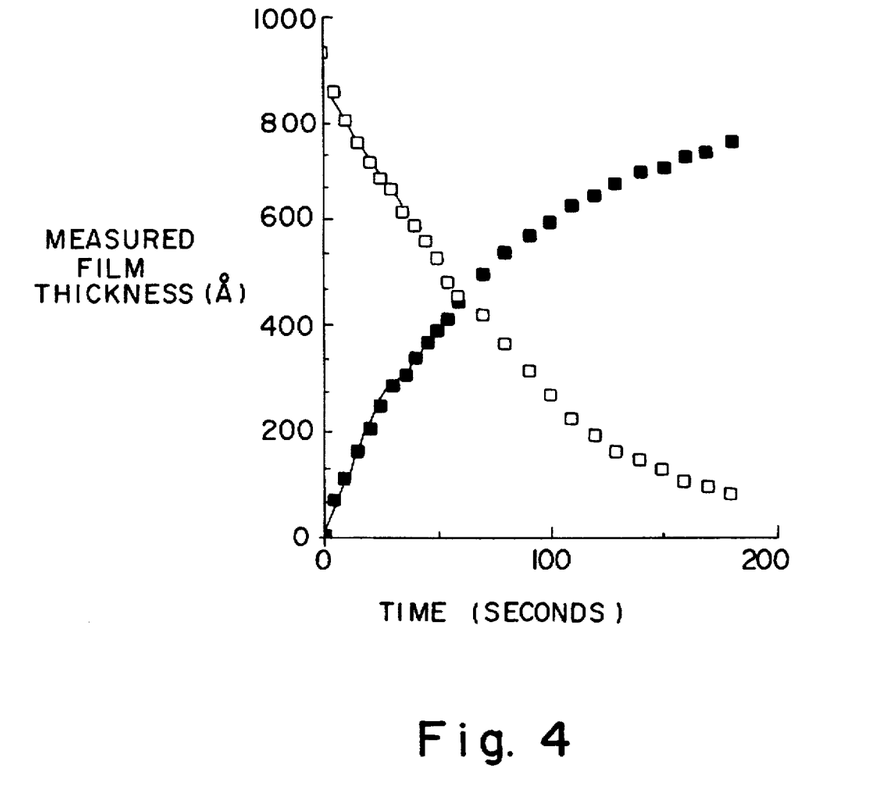
FIG. 4 is a graph of results of the measurement of the generation of radicals using an ECR plasma.

FIG. 3 is a schematic illustration of a deposition apparatus using the large-area radical source related to the seventh mode of the present invention, and FIG. 4 is a graph of the results of the measurement of the radicals generated by an ECR plasma. In the Figure, the numeral 31 indicates a reaction chamber, 32 indicates a substrate, 33 indicates a heater, 34 indicates a quartz crystal oscillator, 35 indicates a silica tube, 36 indicates a heater within the silica tube 35, 37 indicates an ECR plasma generating apparatus, 38 indicates a microwave introducing antenna, 39 indicates a matching box and 40 indicates a microwave electric source.

In the deposition apparatus shown in FIG. 3, the heater 36 within the silica tube 35, the ECR plasma generating apparatus 37, the microwave introducing antenna 38, the matching box 39 and the microwave electric source 40 form the radical source, and the silica tube 35 forms the transportation tube.

In the example shown in FIG. 3, the silica tube 35 which forms the transportation tube is heated at not less than 300° C. using the built-in heater 36. When this transportation tube which is heated at not less than 300° C. is used, the surface of the substrate 32 does not become exposed to charged particles, and moreover, it is also possible to decrease the amount of recombination of the radicals. As a result of this, a larger flux of radicals can be introduced onto the surface of the substrate 32.

As a plasma source (radical generating source) which improves the efficiency of the transport of radicals to the substrate 32, an ECR plasma source where the discharge is possible even at low pressure is preferred, since with lower reaction pressure the amount of recombination by collision becomes smaller. Furthermore, from the viewpoint of a large-area plasma source, an ECR source using a permanent magnet is more preferable than an ECR source having a magnetic field using an electromagnet. Then, as a permanent magnet, a magnet is preferred which forms very little magnetic field gradient in opposition to the propagation of the microwaves, that is a magnetic field whose width is rapidly attenuated.

The optimum surface temperature of the transportation tube differs according to the type of radical used, but whichever radical is used, the surface temperature may be not less than 300° C. Below this temperature, for example at room temperature, the radicals are adsorbed onto the surface of the transportation tube, recombine with each other on the surface of the transportation tube, and the amount of radicals arriving at the surface of the substrate 32 decreases. Here, with hydrogen atoms the temperature may be not less than 300° C., but with oxygen atoms it is more preferable for the temperature to be not less than 400° C.

From the viewpoint of the adsorbing area of the radicals, with regard to reducing the adsorbing area, the surface roughness (below, $R_{max}$) of the transportation tube is preferably not more than 0.1 µm.

For the material of the transportation tube, oxide to protect against oxygen radicals, nitride to protect against nitrogen radicals, oxide or nitride to protect against hydrogen radicals and nitride to protect against halogen-series radicals are preferred. The above-mentioned oxide or nitride may be coated on the surface of a metal such as stainless steel.

Since the remainder of the construction is not particularly different from conventional radical sources, a detailed explanation of this construction is omitted.

Next, radical fluxes were generated using a radical source constructed in this way, and the amounts generated were measured. These results are shown in FIG. 4. At this time, calculation of the radical fluxes was carried out by converting the generated amounts of oxygen atomic and hydrogen atomic fluxes obtained from the rates of oxidation and reduction of silver on the quartz crystal oscillator 34. That is to say, firstly, using an oxygen plasma, the silver on the quartz crystal oscillator 34 was oxidized, and from the weight increase of this, the oxygen atomic flux was determined. This result was an oxygen atomic flux of $5\times10^{15}$ atom/cm$^2$ s. Next, from the reduction rate of the oxidized silver, in other words, the weight reduction, the hydrogen atomic flux was determined. This result was a hydrogen atomic flux of $5\times10^{15}$ atom/cm$^2$ s.

In this, because of the uncertainty of the oxygen and hydrogen adherence build-up, the absolute value is not always accurate, but since measurement of the minimum amount of flux is possible, to give a value not less than a certain value, a relative comparison can be carried out.

A more detailed explanation of the seventh mode of the present invention is given below, based on more specific examples.

EXAMPLE 16 AND COMPARATIVE EXAMPLE 4

Using as the plasma source, the apparatus shown in FIG. 3 of an ECR plasma generating apparatus 37 having an ECR discharge tube 37b using a permanent magnet 37a, under conditions of 400 sccm hydrogen gas, 20 mTorr pressure and 450 W microwave power, a plasma was generated inside a silica tube of internal diameter 150 mm and $R_{max}$ of not more than 0.05 µm, and the radicals generated by this were introduced to the substrate 32 via the transportation tube. At this time, the generated radical fluxes of oxygen atoms and hydrogen atoms in the vicinity of the substrate 32 were measured using the aforesaid method, and the measurement results are shown in Table 3 (Example 16). Radicals were generated similarly to Example 16, except that a silica tube with a ground inner surface was used, and the radical fluxes of oxygen atoms and hydrogen atoms generated at this time were measured in the vicinity of the substrate 32 using the aforesaid method. The results are shown collectively in Table 31 (Comparative Example 4).

Here, measurement of charged particles near the substrate 32 was carried out with a Langmuir probe, but in Example 16, neither ions nor electrons were observed.

As is clear from Table 3, it is seen that by using a silica tube having an inner surface of $R_{max}$ not more than 0.05 µm, the radical flux is increased compared to a silica tube having a ground inner surface.

EXAMPLES 17 and 18, AND COMPARATIVE EXAMPLES 5 to 7

Using the silica tube of Example 16, the effect of the surface temperature of the silica tube was investigated. The results are shown in Table 4 (Examples 17 and 18, and Comparative Examples 5 to 7).

As is clear from Table 4, it can be seen that by raising the temperature of the surface of the silica tube, the radical flux is abruptly increased.

TABLE 3

| Surface condition | Oxygen atomic flux (atom/cm$^2$ s) | Hydrogen atomic flux (atom/cm$^2$ s) |
| --- | --- | --- |
| Silica tube having a ground inner surface (Comp. Ex. 4) | $1 \times 10^{15}$ | $2 \times 10^{15}$ |
| Silica tube having $R_{max}$ | $5 \times 10^{15}$ | $5 \times 10^{15}$ |

TABLE 3-continued

| Surface condition | Oxygen atomic flux (atom/cm$^2$ s) | Hydrogen atomic flux (atom/cm$^2$ s) |
| --- | --- | --- |
| of not more than 0.05 µm (Example 16) | | |

TABLE 4

| Surface condition | Oxygen atomic flux (atom/cm$^2$ s) | Hydrogen atomic flux (atom/cm$^2$ s) |
| --- | --- | --- |
| Room temperature (Comp. Ex. 5) | $5 \times 10^{15}$ | $1 \times 10^{15}$ |
| 100° C. (Comp. Ex. 6) | $1 \times 10^{16}$ | $2 \times 10^{16}$ |
| 200° C. (Comp. Ex. 7) | $2 \times 10^{16}$ | $4 \times 10^{16}$ |
| 300° C. (Example 17) | $3 \times 10^{16}$ | $7 \times 10^{16}$ |
| 400° C. (Example 18) | $4 \times 10^{16}$ | $8 \times 10^{16}$ |

As explained above, according to the seventh mode of the present invention, it is possible to offer a radical source capable of irradiating a large area, in which both the substrate is not exposed to charged particles, and attenuation by recombination of radicals can be avoided.

Potential for Industrial Application

As explained above, according to the present invention, it is possible to control the grain size of a polysilicon thin film while fabricating on an inexpensive glass substrate or metal substrate.

I claim:

1. A method for producing a substrate having crystalline silicon nuclei for forming a polysilicon thin film, comprising: forming an amorphous silicon film of a thickness not more than 200 Å; irradiating excimer laser light onto said amorphous silicon film to crystallize silicon particles contained in said amorphous silicon film; and irradiating said amorphous silicon film with hydrogen radicals to etch said amorphous silicon film so as to remove non-crystalline silicon particles, wherein the flux of hydrogen radicals in the vicinity of the substrate is not less then $1\times10^{15}$ atom/cm$_2$ s.

2. A method for producing a substrate, having crystalline silicon nuclei for forming a polysilicon thin film of claim 1, wherein the excimer laser is an ArF, KrF or $F_2$ excimer laser.

3. A method for producing a substrate, having crystalline silicon nuclei for forming a polysilicon thin film of claim 1, wherein the energy of the excimer laser is not less than 20 mJ/cm$^2$.

4. A method for producing a substrate, having crystalline silicon nuclei for forming a polysilicon thin film of claim 1, wherein the amorphous silicon film is fabricated by plasma CVD.

5. A method for producing a substrate, having crystalline silicon nuclei for forming a polysilicon thin film of claim 2, wherein the energy of the excimer laser is not less than 20 mJ/cm$^2$.

6. A method as recited in claim 1, wherein said amorphous silicon film is formed by depositing amorphous silicon on a glass substrate.

* * * * *